(12) United States Patent
Wakaoka

(10) Patent No.: US 11,740,029 B2
(45) Date of Patent: Aug. 29, 2023

(54) VAPOR CHAMBER

(71) Applicant: Murata Manufacturing Co., Ltd., Nagaokakyo (JP)

(72) Inventor: Takuo Wakaoka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 52 days.

(21) Appl. No.: 16/922,371

(22) Filed: Jul. 7, 2020

(65) Prior Publication Data

US 2020/0333082 A1 Oct. 22, 2020

Related U.S. Application Data

(63) Continuation of application No. PCT/JP2019/033922, filed on Aug. 29, 2019.

(30) Foreign Application Priority Data

Nov. 16, 2018 (JP) ................................. 2018-215501

(51) Int. Cl.
*F28D 15/04* (2006.01)
*B23K 101/14* (2006.01)

(52) U.S. Cl.
CPC .......... *F28D 15/04* (2013.01); *B23K 2101/14* (2018.08); *F28F 2275/06* (2013.01)

(58) Field of Classification Search
CPC .. F28D 15/04; B23K 2101/14; F28F 2275/06; F28F 2275/067; F28F 2275/062
USPC .................................................... 165/104.21
See application file for complete search history.

(56) References Cited

U.S. PATENT DOCUMENTS

| 5,699,856 | A | * | 12/1997 | Merle | ..................... F28F 3/042 165/DIG. 387 |
| 8,807,203 | B2 | * | 8/2014 | MacDonald | ............ F28D 15/04 165/104.21 |
| 10,119,770 | B2 | | 11/2018 | Aoki et al. | |
| 2003/0136551 | A1 | * | 7/2003 | Bakke | ................... F28D 15/046 165/170 |

(Continued)

FOREIGN PATENT DOCUMENTS

| CN | 102317027 A | * | 1/2012 | ......... B23K 20/1265 |
| JP | H05166462 A | | 7/1993 | |

(Continued)

OTHER PUBLICATIONS

International Search Report issued for PCT/JP2019/033922, dated Nov. 26, 2019.

(Continued)

*Primary Examiner* — Tho V Duong
(74) *Attorney, Agent, or Firm* — ArentFox Schiff LLP

(57) ABSTRACT

A vapor chamber having a housing that includes a first metal sheet and a second metal sheet which face each other and respective outer edges thereof are joined to each other to form a welded portion; a bead portion in a region of at least one of the first metal sheet and the second metal sheet surrounded by the welded portion in a plan view of the vapor chamber, the bead portion comprising melted and solidified metal from the at least one of the first metal sheet and the second metal sheet; a working fluid encapsulated in the housing; and a wick in or on an inner wall surface of the first metal sheet or the second metal sheet.

19 Claims, 4 Drawing Sheets

(56) References Cited

U.S. PATENT DOCUMENTS

| | | | |
|---|---|---|---|
| 2006/0096740 A1* | 5/2006 | Zheng | F28D 15/0233 |
| | | | 165/104.33 |
| 2007/0295486 A1* | 12/2007 | Su | F28D 15/046 |
| | | | 165/104.26 |
| 2009/0040726 A1* | 2/2009 | Hoffman | F28D 15/0233 |
| | | | 29/890.032 |
| 2017/0138673 A1* | 5/2017 | Aoki | B23K 26/206 |
| 2017/0248378 A1 | 8/2017 | Aoki et al. | |
| 2020/0025457 A1* | 1/2020 | Lin | F28D 15/0233 |
| 2020/0045848 A1 | 2/2020 | Wakaoka et al. | |

FOREIGN PATENT DOCUMENTS

| | | |
|---|---|---|
| JP | H11287578 A | 10/1999 |
| JP | 2003314979 A | 11/2003 |
| JP | 5788069 B1 | 9/2015 |
| JP | 2016050713 A | 4/2016 |
| WO | 2018199217 A1 | 11/2018 |

OTHER PUBLICATIONS

Written Opinion of the International Searching Authority issued for PCT/JP2019/033922, dated Nov. 26, 2019.

* cited by examiner

FIG. 10 – PRIOR ART
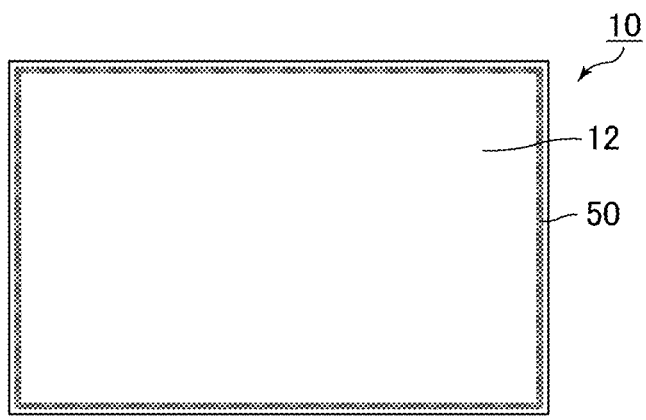
FIG. 11 – PRIOR ART
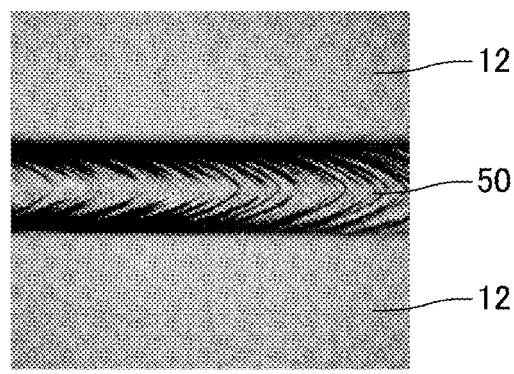

VAPOR CHAMBER

CROSS REFERENCE TO RELATED APPLICATIONS

The present application is a continuation of International application No. PCT/JP2019/033922, filed Aug. 29, 2019, which claims priority to Japanese Patent Application No. 2018-215501, filed Nov. 16, 2018, the entire contents of each of which are incorporated herein by reference.

FIELD OF THE INVENTION

The present invention relates to a vapor chamber.

BACKGROUND OF THE INVENTION

Currently, due to an increase in integration density of elements and improvement of the performance of the elements, the amount of heat generated in an electronic device keeps increasing. Furthermore, heat generating density has also been increasing as the size of the electronic devices are reduced, and accordingly, heat dissipation measures are becoming more important. This situation is more significant in mobile terminals such as smartphones and tablets, and where the thermal design thereof becomes is very challenging. Although graphite sheets and the like are used as heat dissipation countermeasures, the amount of thermal transport is not sufficient in such graphite sheets.

Examples of the heat dissipation countermeasures having a high thermal transport capability include a vapor chamber that is a planar heat pipe. An apparent thermal conductivity of the entirety of the vapor chamber is several to several tens of times higher than that of metal such as copper or aluminum.

Generally, the vapor chamber has a housing that encapsulates a wick that transports a working fluid by using a capillary force. The above-described working fluid absorbs heat from a heat generating element in an evaporating portion and evaporates in the vapor chamber. The gas phase of the working fluid then moves to a condensing portion and is cooled and returns to the liquid phase. The liquid phase of the working fluid moves again to the heat generating element side (evaporating portion) using the capillary force of the wick and cools the heat generating element. When this cycle is repeatedly performed, the vapor chamber can autonomously operate without external power and utilize latent heat of vaporization of the working fluid and latent heat of condensation of the working fluid so as to diffuse heat two-dimensionally at a high speed.

Patent Document 1 discloses a flat-surface type heat pipe that includes a container, a working fluid, and a wick structure. The container has a hollow formed at a central portion thereof by two plate-shaped bodies that face each other. The working fluid is encapsulated in the hollow. The wick structure is provided in the hollow. At least one of the above-described plate-shaped bodies is a combined member in which two or more types of metal members are laminated and integrated. In the combined member, a metal member that forms a layer in contact with the hollow portion has a thermal conductivity of 200 W/m·K or greater, and a metal member that forms a layer in contact with the outside has a thermal conductivity of 100 W/m·K or greater. An outer peripheral portion of the hollow is sealed by laser welding or resistance welding.

Although not directly related to vapor chambers, Patent Document 2 discloses a laser welding method of manufacturing a highly reliable vacuum container for a flat-plate type display that can maintain high degree of airtightness. In this method, after laser welding has been performed on an outer periphery of the vacuum container, an inner periphery disposed further inward than a portion where the above-described laser welding has been performed is laser welded at a lower power density than the power density at the outer periphery. According to Patent Document 2, with two types of laser welded portions obtained under different welding conditions reliability is improved.

Patent Document 1: Japanese Unexamined Patent Application Publication No. 2016-50713

Patent Document 2: Japanese Unexamined Patent Application Publication No. 5-166462

SUMMARY OF THE INVENTION

FIG. 10 is a plan view of a related-art vapor chamber when seen from a second sheet side. FIG. 11 is a photograph of a weld line.

In FIGS. 10 and 11, a housing 10 included in a vapor chamber has a welded portion 50 where outer edges of a first sheet (not illustrated, see FIG. 1) and a second sheet 12 are welded to each other. The welded portion 50 includes continuous linear weld lines.

However, when the weld line has a linear shape as is the case with the welded portion 50 illustrated in FIGS. 10 and 11, thermal distortion is accumulated during welding. As a result, there occurs a problem in that the housing is bent.

The present invention has been made to solve the above-described problem, and an object of the present invention is to provide a vapor chamber in which bending of a housing during welding can be reduced.

A vapor chamber according to the present invention includes a housing, a working fluid, and a wick. The housing includes a first metal sheet and a second metal sheet which face each other and respective outer edges thereof are joined to each other to form a welded portion. The working fluid is encapsulated in the housing. The wick is provided in or on an inner wall surface of the first sheet or the second sheet. At least one of the first metal sheet and the second metal sheet has a bead portion in a region thereof surrounded by the welded portion in a plan view of the vapor chamber. The bead portion comprises a melted and solidified metal from the at least one of the first metal sheet and the second metal sheet.

According to the present invention, the vapor chamber in which bending of the housing during welding can be reduced can be provided.

BRIEF DESCRIPTION OF THE DRAWINGS

FIG. 10 is a plan view of a related-art vapor chamber when seen from the second sheet side.

FIG. 11 is a photograph of a weld line.

DETAILED DESCRIPTION OF THE PREFERRED EMBODIMENTS

Hereafter, a vapor chamber according to the present invention is described.

However, the present invention is not limited to structures described below and can be applied by being appropriately changed without departing from the gist of the present invention. The present invention also includes combinations of two or more of the individual preferred structures according to the present invention described below.

Individual embodiments described below are exemplary. Of course, partial replacement or combination of structures described for different embodiments is possible.

Figure 1:
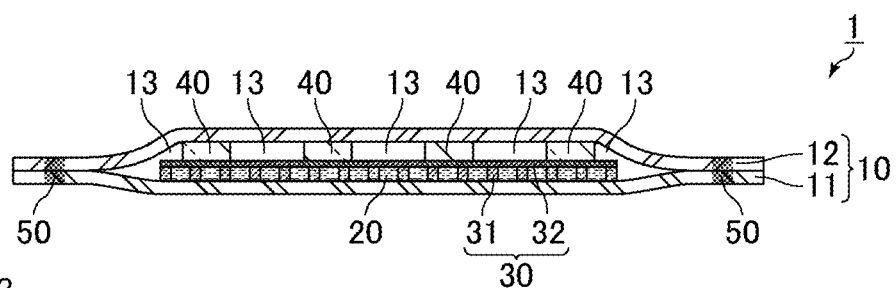
FIG. 1 is a sectional view schematically illustrating an example of a vapor chamber according to the present invention.

FIG. 1 is a sectional view schematically illustrating an example of the vapor chamber according to the present invention. A vapor chamber 1 illustrated in FIG. 1 includes a housing 10, a working fluid 20, and a wick 30. The housing 10 includes a first sheet 11 and a second sheet 12 that face each other. The working fluid 20 is encapsulated in the housing 10. The wick 30 is provided in or on an inner wall surface of the housing 10. Preferably, the vapor chamber 1 includes a plurality of support posts 40 between the first sheet 11 and the second sheet 12 as illustrated in FIG. 1. The housing 10 has a hollow 13 therein. In order to ensure formation of the hollow 13, the first sheet 11 and the second sheet 12 are supported by the support posts 40. The first sheet 11 and the second sheet 12 are joined to each other at the outer edges and sealed. In the vapor chamber 1 illustrated in FIG. 1, the wick 30 is provided in or on the inner wall surface of the first sheet 11. The wick 30 includes a plurality of projections 31 disposed so as to be spaced from each other by a predetermined distance in or on the inner wall surface of the first sheet 11 and a mesh 32 disposed on the projections 31.

In the vapor chamber 1 illustrated in FIG. 1, each of the first sheet 11 and the second sheet 12 is a metal sheet. The housing 10 has a welded portion 50 where the outer edges of the first sheet 11 and the second sheet 12 are welded to each other.

Figure 2:
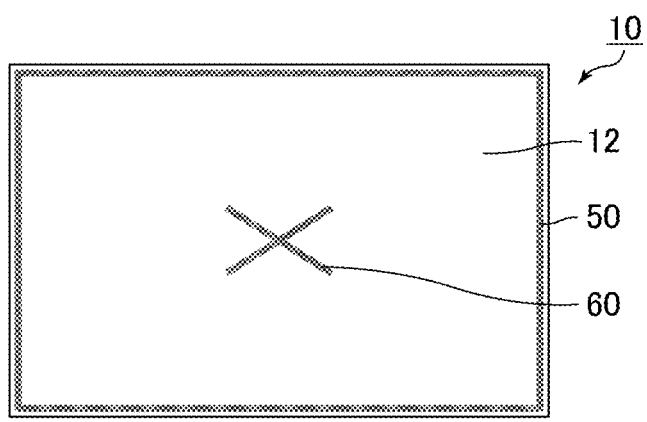
FIG. 2 is a plan view of the vapor chamber illustrated in FIG. 1 when seen from the second sheet side.

FIG. 2 is a plan view of the vapor chamber illustrated in FIG. 1 when seen from the second sheet side.

In FIG. 2, the housing 10 has the welded portion 50 where the outer edges of the first sheet 11 (see FIG. 1) and the second sheet 12 are welded to each other. The welded portion 50 includes continuous linear weld lines. Furthermore, the second sheet 12 has a bead portion 60 in a region surrounded by the welded portion 50. The bead portion 60 is formed by melting and solidifying metal that forms the second sheet 12. The bead portion 60 includes bead lines that form an X shape. Preferably, the bead portion 60 is disposed at the center of the second sheet 12.

In FIG. 2, the bead portion 60 is provided in the second sheet 12. However, the bead portion 60 may be provided in the first sheet 11 instead of the second sheet 12, or bead portion 60 may be provided in each of the first sheet 11 and the second sheet 12.

The vapor chamber according to the present invention is characterized in that a first sheet is a metal sheet, a second sheet is a metal sheet, a housing has a welded portion where outer edges of the first sheet and the second sheet are welded to each other, and at least one of the first sheet and the second sheet has a bead portion formed by melting and solidifying metal that forms the at least one of the sheets in a region surrounded by the welded portion in the plan view.

As is the case with the welded portion, the bead portion can be provided by melting and solidifying the metal that forms the at least one of the sheets. Thus, with the bead portion provided in at least one of the first sheet and the second sheet, bending that occurs during welding of the outer edges of the first sheet and the second sheet is canceled out. Accordingly, bending of the housing during welding can be reduced.

In the vapor chamber according to the present invention, the bead portion may be provided in the first sheet or the second sheet. As illustrated in FIG. 1, when a wick is provided in or on an inner wall surface of the first sheet, the bead portion is preferably provided in the second sheet.

In the vapor chamber according to the present invention, the bead portion in the first sheet is formed by melting and solidifying the metal that forms the first sheet, and the bead portion in the second sheet is formed by melting and solidifying the metal that forms the second sheet.

In the vapor chamber according to the present invention, disposition of the bead portion is not particularly limited as long as the bead portion is provided in a region surrounded by the welded portion. However, when the vapor chamber includes a plurality of support posts between the first sheet and the second sheet as illustrated in FIG. 1, the bead portion is preferably superposed on one of the support posts in the plan view. When the bead portion is superposed on the support post, bending of the housing during welding can be controlled by adjusting the depth of the bead portion.

Figure 3:
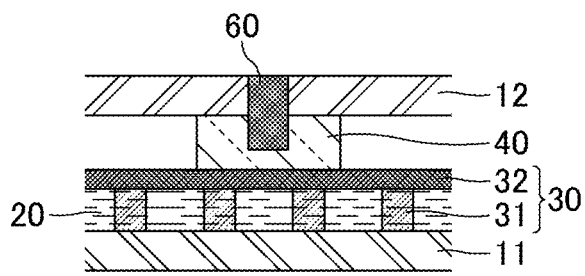
FIG. 3 is a sectional view schematically illustrating an example of a bead portion disposed at a position superposed on one of support posts.

FIG. 3 is a sectional view schematically illustrating an example of the bead portion disposed at a position superposed on the support post.

In FIG. 3, the bead portion 60 penetrates through the second sheet 12 and reaches one of the support posts 40 but does not penetrate completely through the support post 40.

In the vapor chamber according to the present invention, the depth of the bead portion is not particularly limited.

When the vapor chamber does not include the support posts between the first sheet and the second sheet, or the vapor chamber includes the support posts between the first sheet and the second sheet and the bead portion is disposed at a position not superposed on the support post in the plan view, the depth of the bead portion is preferably smaller than the depth of the first sheet or the second sheet.

When the vapor chamber includes the support posts between the first sheet and the second sheet and the bead portion is disposed at a position superposed on the support post in the plan view, the depth of the bead portion may be smaller than the depth of the first sheet or the second sheet, or the bead portion may penetrate through the first sheet or the second sheet and reach the support post. When the bead portion reaches the support post, the bead portion preferably does not penetrate through the support post. However, a portion where the wick does not exist may be provided between the first sheet and the second sheet, and the first sheet and the second sheet may be welded to each other by the bead portion with the support post interposed between the first sheet and the second sheet.

The first sheet and the second sheet may be welded to each other by the bead portion at a portion where the bead portion is not superposed on the support post in the plan view (including the case where the support posts are not provided).

When the first sheet and the second sheet are welded to each other, the welding may be performed at a portion where the wick exists in the plan view.

When the first sheet and the second sheet are welded to each other, the strength of the vapor chamber increases compared to the case where the first sheet and the second sheet are not welded to each other.

In the vapor chamber according to the present invention, the shape of the bead portion is not particularly limited, and the bead portion may have any shape.

Figure 4:
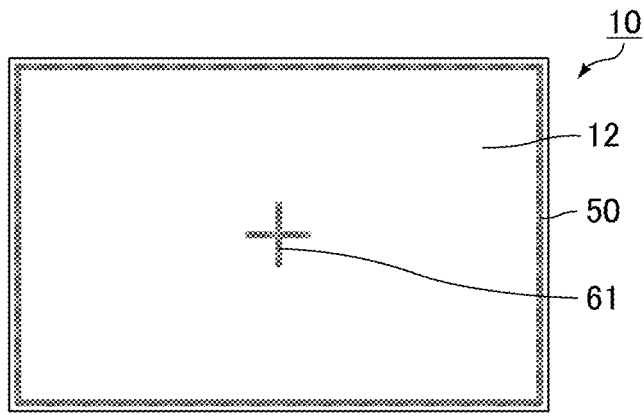
FIG. 4 is a plan view schematically illustrating another example of the bead portion.

FIG. 4 is a plan view schematically illustrating another example of the bead portion.

In FIG. 4, a bead portion 61 includes bead lines that form a criss-cross shape. The bead portion 61 is disposed at the center of the second sheet 12.

Figure 5:
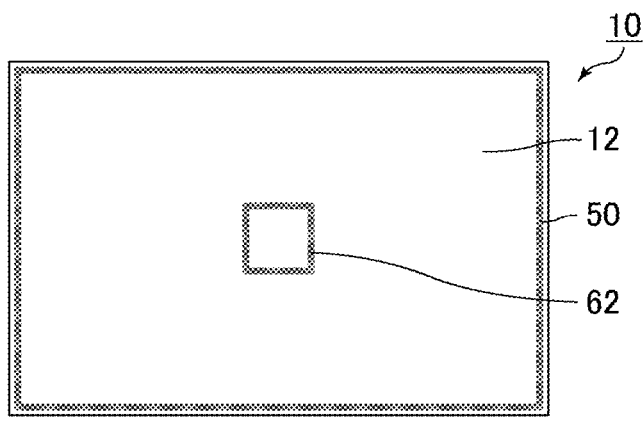
FIG. 5 is a plan view schematically illustrating another example of the bead portion.

FIG. 5 is a plan view schematically illustrating another example of the bead portion.

In FIG. 5, a bead portion 62 includes bead lines that form a rectangular shape (square shape). The bead portion 62 is disposed at the center of the second sheet 12.

Figure 6:
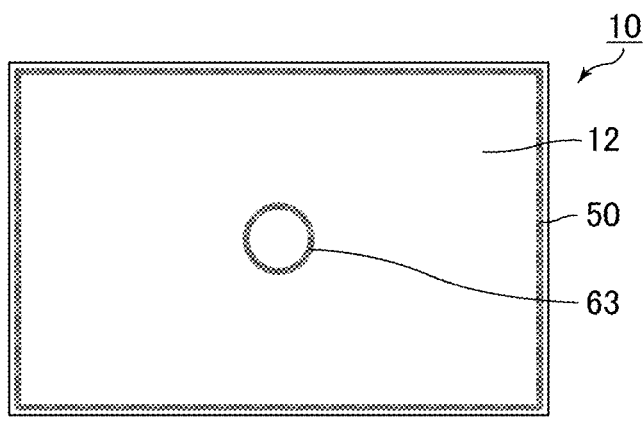
FIG. 6 is a plan view schematically illustrating another example of the bead portion.

FIG. 6 is a plan view schematically illustrating another example of the bead portion.

In FIG. 6, a bead portion 63 includes a bead line that forms a circular shape (circular shape). The bead portion 63 is disposed at the center of the second sheet 12.

In the vapor chamber according to the present invention, the number of bead portions is not particularly limited. The vapor chamber may have a single bead portion or a plurality of bead portions.

As described above, the disposition, the shape, the number, or the like of the bead portions is not particularly limited. However, when the shape of the housing is line symmetric in the plan view as illustrated in FIGS. 2, 4, 5, and 6, the bead portion is preferably disposed so as to be symmetric about the line of symmetry of the housing in the plan view. In this case, stress exerted on the housing during welding can be reduced.

In the vapor chamber according to the present invention, the shape of the housing is not particularly limited.

Examples of the shape of the housing in the plan view (the shape seen from above in FIG. 1) include, for example, a polygon such as triangle and a rectangle, a circle, an ellipse, a shape that is a combination of these shapes, and so forth.

In the vapor chamber according to the present invention, the shape of the welded portion is not particularly limited.

The welded portion may include continuous linear weld lines or non-linear weld lines.

Figure 7:
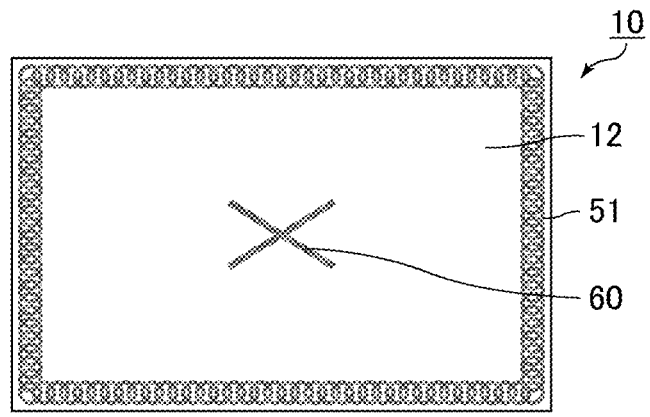
FIG. 7 is a plan view schematically illustrating another example of a welded portion.

FIG. 7 is a plan view schematically illustrating another example of the welded portion.

In FIG. 7, a welded portion 51 includes a plurality of circular weld lines superposed on each other. When the weld lines have a circular shape, thermal distortion is not accumulated in a single direction. Thus, bending of the housing during welding can be further reduced. In addition, when the circular weld lines are superposed on each other, airtightness can be ensured.

Figure 8:
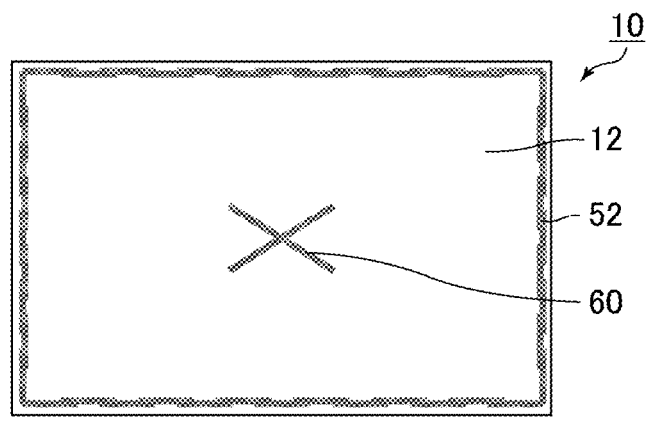
FIG. 8 is a plan view schematically illustrating another example of the welded portion.

FIG. 8 is a plan view schematically illustrating another example of the welded portion.

In FIG. 8, a welded portion 52 includes a plurality of linear weld lines superposed on each other. When the linear weld lines are connected to each other, thermal distortion is not accumulated in a single direction. Thus, bending of the housing during welding can be further reduced. In addition, when the number of portions where the weld lines are connected to each other is increased, reliability is improved.

Figure 9:
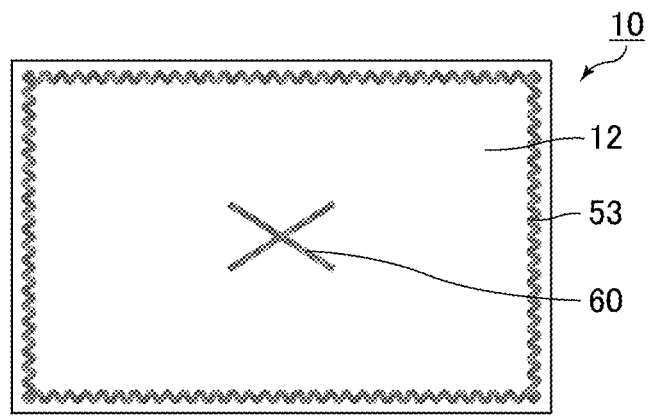
FIG. 9 is a plan view schematically illustrating another example of the welded portion.

FIG. 9 is a plan view schematically illustrating another example of the welded portion.

In FIG. 9, a welded portion 53 includes a wave-shaped weld line. When the weld line has a wave shape, thermal distortion is not accumulated in a single direction. Thus, bending of the housing during welding can be further reduced.

In the vapor chamber according to the present invention, the first sheet and the second sheet included in the housing may be superposed on each other such that end portions of the first sheet and the second sheet are aligned with each other or not aligned with each other.

In the vapor chamber according to the present invention, each of the first sheet and the second sheet is a metal sheet. The material of the first sheet or the second sheet is not particularly limited as long as the material has characteristics suitable for use as the vapor chamber such as, for example, thermal conduction characteristics, strength, and flexibility. Examples of the material of the first sheet and the second sheet include, for example, copper, nickel, aluminum, magnesium, titanium, iron, and so forth, and alloys including any of these materials as the principal component, and so forth. It is particularly preferred that the material of the first sheet and the second sheet be copper.

In the vapor chamber according to the present invention, the material of the first sheet may be different from the material of the second sheet. For example, when the material of the first sheet and the material of the second sheet are different from each other, one function can be obtained by using one of the sheets and another function can be obtained by using the other sheet. Although the above-described functions are not particularly limited, examples of the functions include, for example, a thermal conducting function, an electro-magnetic interference shielding functions, and so forth.

In the vapor chamber according to the present invention, the thickness of the first sheet or the second sheet is not particularly limited. However, when the thicknesses of the first sheet and the second sheet are excessively small, the strength of the housing is reduced, and accordingly, the housing is likely to be deformed. For this reason, the thickness of each of the first sheet and the second sheet is preferably 20 μm or greater, and more preferably, 30 μm or greater. In contrast, when the thicknesses of the first sheet and the second sheet are excessively great, the thickness of the entire vapor chamber is unlikely to be reduced. For this reason, the thickness of each of the first sheet and the second sheet is preferably 200 μm or smaller, more preferably 150 μm or smaller, and still more preferably, 100 μm or smaller. The thicknesses of the first sheet and the second sheet may be the same or different from each other.

When projections included in the wick are integral with the first sheet, the thickness of the first sheet is defined as the thickness of a portion of the first sheet not in contact with the projections. When the support posts are integral with the second sheet, the thickness of the second sheet is defined as the thickness of a portion of the second sheet not in contact with the support posts.

In the vapor chamber according to the present invention, the first sheet may have a uniform thickness or may have a portion having a great thickness and a portion having a small thickness. Likewise, the second sheet may have a uniform thickness or may have a portion having a great thickness and a portion having a small thickness. Furthermore, the portion of the second sheet not in contact with the support posts may be recessed toward the inside of the housing.

In the vapor chamber according to the present invention, a working fluid is not particularly limited as long as the working fluid can undergo gas-liquid phase changes in the environment in the housing. Water, alcohol, a chlorofluorocarbon substitute, or the like can be used as the working fluid. The working fluid is preferably an aqueous compound, and more preferably, water.

In the vapor chamber according to the present invention, the wick may be provided only in or on the inner wall surface of the first sheet, only in or on an inner wall surface of the second sheet, or in or on the inner wall surfaces of the first sheet and the second sheet as long as the wick is provided in or on the inner wall surface of the housing.

In the vapor chamber according to the present invention, the wick is not particularly limited as long as the wick has a capillary structure that allows the working fluid to move due to a capillary pressure. The capillary structure of the wick may be a known structure used for the related-art vapor chamber. Examples of the capillary structure include, for example, a porous structure, a fiber structure, a groove structure, a mesh structure and other fine structures having recesses and projections such as pores, grooves, and protrusions.

In the vapor chamber according to the present invention, the wick is preferably continuously provided from an evaporating portion to a condensing portion in the housing. At least part of the wick may be integral with the housing.

In the vapor chamber according to the present invention, the wick includes, for example, a plurality of the projections disposed so as to be spaced from each other by a predetermined distance in or on the inner wall surface of the first sheet. The wick may further include a mesh, a nonwoven fabric, or a porous body on the projections. The wick may include a mesh, a nonwoven fabric, or a porous body disposed directly on the inner wall surface of the first sheet.

In the vapor chamber according to the present invention, when the wick includes the plurality of projections in or on the inner wall surface of the first sheet, the working fluid can be held between the projections. Thus, a thermal transport capability of the vapor chamber can be improved.

Herein, the projections refer to portions that have a relatively greater height than the height of surrounding structures. In addition to portions projecting from the inner wall surface, the projections also refer to portions that have a relatively greater height due to, for example, grooves or other recesses formed in the inner wall surface.

The shape of the projections is not particularly limited. Examples of the shape of the projections include, for example, a columnar shape, a prismatic shape, a truncated cone shape, a truncated pyramid shape, and so forth. The projections may have a wall shape. That is, a shape in which grooves are formed between adjacent projections is possible.

The projections may be integral with the first sheet and may be formed by, for example, performing etching or the like on the inner wall surface of the first sheet.

The vapor chamber according to the present invention preferably includes the plurality of support posts between the first sheet and the second sheet in order to support the first sheet and the second sheet from inside.

When, for example, the inside of the housing is decompressed or an external pressure is applied from the outside of the housing, deformation of the housing can be suppressed by the support posts disposed in the housing. The support posts may be in direct contact with the first sheet and the second sheet to support the first sheet and the second sheet or may support the first sheet and the second sheet with another member, for example, the wick or the like interposed between the support posts and the first sheet and between the support posts and the second sheet.

The shape of the support posts is not particularly limited. Examples of the shape of the support posts include, for example, a columnar shape, a prismatic shape, a truncated cone shape, a truncated pyramid shape, and so forth.

Although arrangement of the support posts is not particularly limited, the support posts are preferably arranged equally, for example, arranged as is the case with grid points so as to be spaced from each other by a uniform distance. When the support posts are equally arranged, a uniform strength can be ensured throughout the vapor chamber.

The support posts are preferably provided in or on the inner wall surface of the second sheet. In this case, the support posts may be integral with the second sheet. For example, the support posts may be formed by performing a process such as etching on the inner wall surface of the second sheet.

A method of manufacturing the vapor chamber according to the present invention is not particularly limited as long as the above-described structure can be obtained. For example, the above-described structure can be obtained by superposing on each other the first sheet in or on which the wick is disposed and the second sheet in or on which the support posts are disposed, joining the first sheet and the second sheet to each other except for a cavity for encapsulation of the working fluid, pouring the working fluid into the housing through the cavity, and then sealing the cavity. In so doing, the bead portion is preferably formed in the second sheet in or on which the support posts are disposed. The bead portion may be formed before or after the joining of the first sheet and the second sheet.

A method of joining the first sheet and the second sheet is not particularly limited as long as the method is welding. Examples of the welding include, for example, laser welding, resistance welding, and so forth.

A method of forming the bead portion is not particularly limited as long as the method is welding. Examples of the welding include, for example, laser welding, resistance welding, and so forth. A method of the welding for forming the bead portion may be the same as or different from a method of the welding for joining the first sheet and the second sheet.

The vapor chamber according to the present invention is not limited to the above-described embodiment. Various applications and variations can be added to the structure, manufacturing conditions, and so forth of the vapor chamber within the scope of the present invention.

The vapor chamber according to the present invention, which has a high thermal transport capability and a high thermal diffusion capability as described above, is preferably used as a heat dissipating device.

The vapor chamber according to the present invention, which is advantageous for reducing the size, particularly for reducing the thickness, is suitable for use in devices the size of which is required to be reduced, for example, electronic devices.

For the embodiment having been described above, the bead portion is provided in a region surrounded by the welded portion in at least one of the first sheet and the second sheet. However, in the following vapor chambers that have the respective welded portion, accumulation of thermal distortion can be suppressed without the bead portion in the region surrounded by the welded portion. Accordingly, bending of the housing during welding can be reduced.

REFERENCE SIGNS LIST 1 vapor chamber
10 housing
11 first sheet
12 second sheet
13 hollow
20 working fluid
30 wick
31 projection
32 mesh
40 support post
50, 51, 52, 53 welded portion
60, 61, 62, 63 bead portion

The invention claimed is:

1. A vapor chamber comprising:
a housing that includes a first metal sheet and a second metal sheet which face each other and respective outer edges thereof are joined to each other to form a welded portion;
a bead portion in a region of at least one of the first metal sheet and the second metal sheet surrounded by the welded portion in a plan view of the vapor chamber, the bead portion comprising melted and solidified metal from the at least one of the first metal sheet and the second metal sheet;
a working fluid encapsulated in the housing;
a wick provided in or on an inner wall surface of the first metal sheet or the second metal sheet; and
a plurality of support posts disposed between the first metal sheet and the second metal sheet and that support the first metal sheet and the second metal sheet from an inside of the housing,
wherein the bead portion is superposed on one support post of the plurality of support posts in the plan view, and
wherein a depth of the bead portion is smaller than a depth of the at least one of the first metal sheet and the second metal sheet.

2. The vapor chamber according to claim 1, wherein a shape of the housing is line symmetric in the plan view, and the bead portion is disposed so as to be symmetric about a line of symmetry of the housing in the plan view.

3. The vapor chamber according to claim 1, wherein the welded portion includes a plurality of circular weld lines superposed on each other.

4. The vapor chamber according to claim 1, wherein the welded portion includes a plurality of linear weld lines superposed on each other.

5. The vapor chamber according to claim 1, wherein the welded portion includes a wave-shaped weld line.

6. The vapor chamber according to claim 1, wherein the bead portion includes bead lines that form a rectangular shape.

7. The vapor chamber according to claim 1, wherein the bead portion includes a bead line that forms a circular shape.

8. A vapor chamber comprising:
a housing that includes a first metal sheet and a second metal sheet which face each other and respective outer edges thereof are joined to each other to form a welded portion;
a bead portion in a region of at least one of the first metal sheet and the second metal sheet surrounded by the welded portion in a plan view of the vapor chamber, the bead portion comprising melted and solidified metal from the at least one of the first metal sheet and the second metal sheet;
a working fluid encapsulated in the housing; and
a wick provided in or on an inner wall surface of the first metal sheet or the second metal sheet,
wherein the bead portion includes bead lines that form an X shape.

9. The vapor chamber according to claim 8, wherein the bead portion is disposed at a center of the at least one of the first metal sheet and the second metal sheet.

10. The vapor chamber according to claim 8, further comprising:
a plurality of support posts disposed between the first metal sheet and the second metal sheet and that support the first metal sheet and the second metal sheet from an inside of the housing.

11. The vapor chamber according to claim 10, wherein the bead portion is superposed on one support post of the plurality of support posts in the plan view.

12. The vapor chamber according to claim 11, wherein the bead portion is disposed at a center of the at least one of the first metal sheet and the second metal sheet.

13. The vapor chamber according to claim 11, wherein the bead portion penetrates through the at least one of the first metal sheet and the second metal sheet and reaches the one support post but does not penetrate completely through the one support post.

14. A vapor chamber comprising:
a housing that includes a first metal sheet and a second metal sheet which face each other and respective outer edges thereof are joined to each other to form a welded portion;
a bead portion in a region of at least one of the first metal sheet and the second metal sheet surrounded by the welded portion in a plan view of the vapor chamber, the bead portion comprising melted and solidified metal from the at least one of the first metal sheet and the second metal sheet;
a working fluid encapsulated in the housing; and
a wick provided in or on an inner wall surface of the first metal sheet or the second metal sheet,
wherein the bead portion includes bead lines that form a criss-cross shape.

15. The vapor chamber according to claim 14, further comprising:
a plurality of support posts disposed between the first metal sheet and the second metal sheet and that support the first metal sheet and the second metal sheet from an inside of the housing.

16. The vapor chamber according to claim 15, wherein the bead portion is superposed on one support post of the plurality of support posts in the plan view.

17. The vapor chamber according to claim 16, wherein the bead portion is disposed at a center of the at least one of the first metal sheet and the second metal sheet.

18. The vapor chamber according to claim 16, wherein the bead portion penetrates through the at least one of the first metal sheet and the second metal sheet and reaches the one support post but does not penetrate completely through the one support post.

19. The vapor chamber according to claim 14, wherein the bead portion is disposed at a center of the at least one of the first metal sheet and the second metal sheet.

* * * * *